US009807547B1

(12) United States Patent
Oesterling et al.

(10) Patent No.: US 9,807,547 B1
(45) Date of Patent: Oct. 31, 2017

(54) RELATIONSHIP MANAGEMENT FOR VEHICLE-SHARING SYSTEMS

(71) Applicant: GM GLOBAL TECHNOLOGY OPERATIONS LLC, Detroit, MI (US)

(72) Inventors: Christopher L. Oesterling, Troy, MI (US); Paul H. Pebbles, Novi, MI (US); Julia Steyn, New York, NY (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 0 days.

(21) Appl. No.: 15/278,238

(22) Filed: Sep. 28, 2016

(51) Int. Cl.
*H04W 4/08* (2009.01)
*H04L 29/08* (2006.01)
*H04W 4/00* (2009.01)

(52) U.S. Cl.
CPC ............ *H04W 4/008* (2013.01); *H04L 67/12* (2013.01)

(58) Field of Classification Search
USPC ....................................................... 455/41.2
See application file for complete search history.

(56) References Cited

U.S. PATENT DOCUMENTS

| 9,566,943 B2* | 2/2017 | Ferrieres | B60R 25/04 |
| 2010/0114616 A1* | 5/2010 | Touati | B60R 25/2018 |
| | | | 705/5 |
| 2013/0059575 A1* | 3/2013 | Oesterling | H04W 4/046 |
| | | | 455/422.1 |
| 2014/0073254 A1* | 3/2014 | Ichihara | G07C 5/008 |
| | | | 455/41.2 |
| 2015/0312951 A1* | 10/2015 | Locker | H04W 76/023 |
| | | | 455/41.2 |
| 2016/0093216 A1* | 3/2016 | Lee | H04W 4/046 |
| | | | 340/870.11 |

* cited by examiner

*Primary Examiner* — Edward Urban
*Assistant Examiner* — Ralph H Justus

(57) ABSTRACT

A vehicle-share relationship management system is presented herein. The vehicle-share relationship management system includes a short-range wireless communication (SRWC) module, mobile computing device, vehicle communication platform (VCP), and remote entity. The SRWC is located in a vehicle and configured to communicate with the mobile computing device and at least one vehicle system. The VCP is located within the vehicle, the VCP configured to communicably couple with the SRWC module and configured to generate one or more data transmissions. The remote entity configured to receive the one or more VCP data transmissions. Moreover, the SRWC module collaborates with the vehicle system and mobile computing device to generate one or more notices, the SRWC module subsequently collaborates with the VCP to transmit the one or more notices to the remote entity. In response to the one or more notices, the remote entity communicates one or more notifications to the VCP.

14 Claims, 8 Drawing Sheets

RELATIONSHIP MANAGEMENT FOR VEHICLE-SHARING SYSTEMS

INTRODUCTION

Renting a vehicle typically requires that a reservation be made with a rental company and requires the user to physically travel to the on-site rental facility so as to obtain access to the rental vehicle. While at the facility, the rental company must physically hand over vehicle keys or passive entry/start key fobs. With such systems, the assigned renter is not acknowledged by the company until they have checked in at the rental facility, selected their vehicle, and have been issued keys. This can be a tedious process. Going to the rental site may be time consuming, especially when not within close proximity to the renter. The renter may moreover be forced to wait in line, complete paperwork, and deal with customer service representatives to obtain a vehicle and respective keys. More often than not, this process is required regardless of whether a vehicle reservation was previously made by means such as the internet.

Renting vehicles through vehicle-sharing systems can be a far more autonomous and less tedious process and provides a viable alternative to the typical vehicle rental systems. However, the autonomy that comes with these vehicle-sharing systems may create a source of anxiety for the vehicle renter. It is therefore desirable to manage a relationship between the vehicle renter and vehicle-sharing system.

SUMMARY

A vehicle-share relationship management system is presented herein. The vehicle-share relationship management system includes a short-range wireless communication (SRWC) module, mobile computing device, vehicle communication platform (VCP), and remote entity. The SRWC is located in a vehicle and configured to communicate with the mobile computing device and at least one vehicle system. The VCP is located within the vehicle, the VCP configured to communicably couple with the SRWC module and configured to generate one or more data transmissions. The remote entity configured to receive the one or more VCP data transmissions. Moreover, the SRWC module collaborates with the vehicle system and mobile computing device to generate one or more notices, the SRWC module subsequently collaborates with the VCP to transmit the one or more notices to the remote entity. In response to the one or more notices, the remote entity communicates one or more notifications to the VCP.

The relationship management system may further include the mobile computing device having a CarShare App. As such, the notices may be generated via the mobile computing device and/or the CarShare App. The SRWC module may communicate with the vehicle system and VCP via a vehicle bus. The remote entity may be a server located in a remote call center. The notices may be selected from a group that includes: a door-lock-command notice, a reminder notice, a termination notice, a trip-information notice, mobile device-detection notice, or a combination thereof. The notifications may be selected from a group that includes: an initiation notification, a completion notification, a reservation-termination notification, an expedition notification, a reminder notification, or a combination thereof. The SRWC module may implement a wireless protocol selected from a group that includes: a Bluetooth low power protocol, a Bluetooth protocol, a ZigBee protocol, an iBeacon protocol, an Eddystone protocol, a near field communication protocol, a Wi-Fi protocol, or a combination thereof.

A method of relationship management in a vehicle vehicle-share system is further presented herein. The method includes: (a) providing an SRWC module located in a vehicle and configured to communicate with a mobile computing device and at least one vehicle system; (b) providing a VCP located within the vehicle, the VCP configured to communicably couple with the SRWC module and configured to generate one or more data transmissions; (c) providing a remote entity configured to receive the one or more VCP data transmissions; (d) receiving (at the SRWC module) one or more communications from the mobile computing device; (e) generating (via the SRWC module) one or more notices based on the one or more communications; (f) receiving (at the VCP) the one or more notices; (g) transmitting (via the VCP) the one or more notices to the remote entity; (h) receiving (at the remote entity) the one or more notices; (i) sending (via the remote entity) one or more notifications; and (j) receiving (at the VCP) the one or more notifications from the remote entity.

The method may further include: (k) implementing one or more back-end functions (via the remote entity) to review and analyze the one or more notices. The method may also further include: (k) receiving (at the SRWC module) one or more portions of vehicle dynamics information from one or more vehicle sensors; and (l) compiling (via SRWC module) the vehicle dynamics information. The method may also further include: (k) providing the mobile computing device having a CarShare App; (l) generating (via the mobile computing device and/or the CarShare App) one or more notices; and (m) sending (via the mobile computing device) the one or more notices to the remote entity.

BRIEF DESCRIPTION OF THE DRAWINGS

The disclosed examples will hereinafter be described in conjunction with the following drawing figures, wherein like numerals denote like elements, and wherein.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

The figures disclosed herein are not necessarily to scale; some features could be exaggerated or minimized to show details of particular components. Therefore, specific structural and functional details disclosed herein are not to be interpreted as limiting, but merely as a representative basis for teaching one skilled in the art to variously employ the exemplary aspects of the present disclosure. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Vehicle ride sharing services and self-serve rental services allow consumers to make reservations for station based round trip use of vehicles, particularly in urban environments. These rental vehicles are often located in reserved parking spaces identified with permanently mounted signs or markers. Ideally, a user acquires a vehicle from a reserved parking space and returns the vehicle to the same parking space, or an otherwise similarly marked space. It may also be desirable to provide systems for monitoring a parking space; for example, erecting smart signs that can detect when authorized or unauthorized vehicle is parked in the parking space as well as notify the user or rental company.

Figure 1:
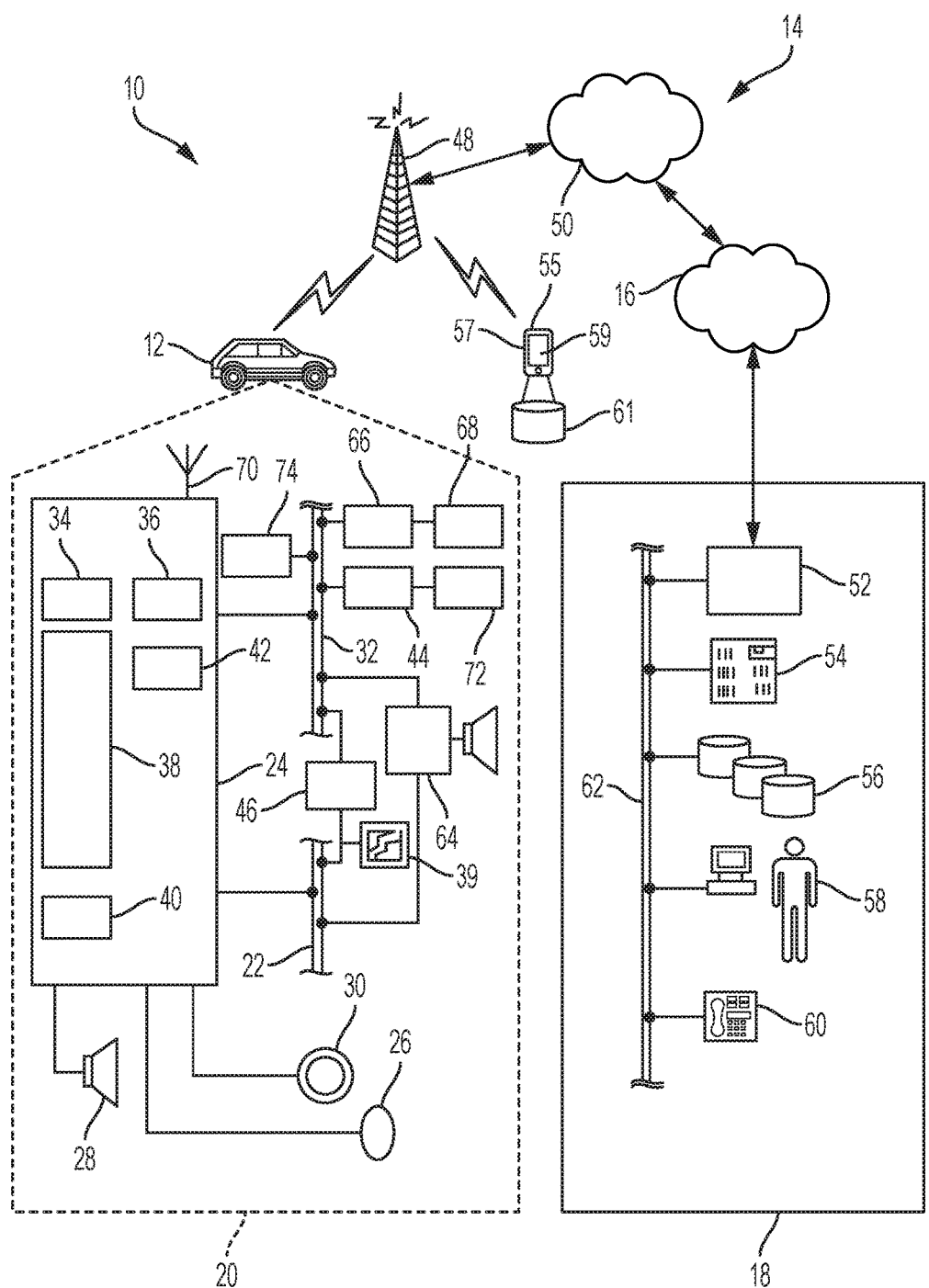
FIG. 1 is a diagram illustrating a non-limiting example of a communication system.

With reference to FIG. 1, there is shown a non-limiting example of a communication system 10 that may be used together with examples of the vehicle-sharing system disclosed herein or to implement examples of the methods disclosed herein. Communication system 10 generally includes a vehicle 12, a wireless carrier system 50, a land network 16 and a call center 18. It should be appreciated that the overall architecture, setup, and operation, as well as the individual components of the illustrated system are merely exemplary and that differently configured communication systems may also be utilized to implement the examples of the method disclosed herein. Thus, the following paragraphs, which provide a brief overview of the illustrated communication system 10, are not intended to be limiting.

Vehicle 12 may be any type of mobile vehicle such as a motorcycle, car, truck, recreational vehicle (RV), boat, plane, etc., and is equipped with suitable hardware and software that enables it to communicate over communication system 10. Some of the vehicle hardware 20 is shown generally in FIG. 1 including a telematics unit 24, a microphone 26, a speaker 28, buttons and/or controls 30 connected to the telematics unit 24, and various vehicle systems such as, but not limited to, vehicle crash and/or collision detection sensor interface 66 and sensor interface modules 44. Operatively coupled to the telematics unit 24 is a network connection or vehicle bus 32. Examples of suitable network connections include a controller area network (CAN), a media oriented system transfer (MOST), a local interconnection network (LIN), an Ethernet, and other appropriate connections such as those that conform with known ISO (International Organization for Standardization), SAE (Society of Automotive Engineers), and/or IEEE (Institute of Electrical and Electronics Engineers) standards and specifications, to name a few.

The telematics unit 24 is an onboard device that provides a variety of services through its communications with the remotely located call center 18, and generally includes an electronic processing device 38, one or more types of electronic memory 40, a cellular chipset/component 34, a wireless modem 36, a dual mode antenna 70, and a navigation unit containing a GNSS chipset/component 42. In one example, the wireless modem 36 includes a computer program and/or set of software routines adapted to be executed within electronic processing device 38.

The telematics unit 24 may provide various services including: turn-by-turn directions, in-vehicle voice messaging (IVVM), and other navigation-related services provided in conjunction with the GNSS chipset/component 42; airbag deployment notification and other emergency or roadside assistance-related services provided in connection with various crash and/or collision sensor interface modules 66 and collision sensors 68 located throughout the vehicle; and/or infotainment-related services where music, internet web pages, movies, television programs, videogames, and/or other content are downloaded by an infotainment center 46 operatively connected to the telematics unit 24 via vehicle bus 32 and audio bus 22. In one example, downloaded content is stored for current or later playback. The above-listed services are by no means an exhaustive list of all the capabilities of telematics unit 24, but are simply an illustration of some of the services that the telematics unit may be capable of offering. It is anticipated that telematics unit 24 may include a number of additional components in addition to and/or different components from those listed above and may collaborate with one or more additional features of communication system 10 to achieve its capabilities.

Vehicle communications may use radio transmissions to establish a voice channel with wireless carrier system 14 so that both voice and data transmissions can be sent and received over the voice channel. Vehicle communications are enabled via the cellular chipset/component 34 for voice communications and the wireless modem 36 for data transmission. Any suitable encoding or modulation technique may be used with the present examples, including digital transmission technologies, such as TDMA (time division multiple access), CDMA (code division multiple access), W-CDMA (wideband CDMA), FDMA (frequency division multiple access), OFDMA (orthogonal frequency division multiple access), etc.

Dual mode antenna 70 services the GNSS chipset/component 42 and the cellular chipset/component 34.

Visual display 39 is preferably a graphics display, such as a touch screen on the instrument panel, a heads-up display reflected off of the windshield, or as part of the console of infotainment center 46, and can be used to provide a multitude of input and output functions (i.e., capable of GUI implementation).

Microphone 26 provides the driver or other vehicle occupant with a means for inputting verbal or other auditory commands, and can be equipped with an embedded voice processing unit utilizing a human/machine interface (HMI) technology known in the art. Conversely, speaker 28 provides audible output to the vehicle occupants and can be either a stand-alone speaker specifically dedicated for use with the telematics unit 24 (e.g., IVVM) or can be part of a vehicle audio component 64. In either event, microphone 26 and speaker 28 enable vehicle hardware 20 and call center 18 to communicate with the occupants through audible speech. The vehicle hardware also includes one or more buttons and/or controls 30 for enabling a vehicle occupant to activate or engage one or more of the vehicle hardware components 20. For example, one of the buttons and/or controls 30 can be an electronic pushbutton used to initiate voice communication with call center 18 (whether it be a human such as advisor 58 or an automated call response system). In another example, one of the buttons and/or controls 30 can be used to initiate emergency services.

The audio component 64 is operatively connected to the vehicle bus 32 and the audio bus 22. The audio component 64 receives analog information, rendering it as sound, via the audio bus 22. Digital information is received via the vehicle bus 32. The audio component 64 provides amplitude modulated (AM) and frequency modulated (FM) radio, compact disc (CD), digital video disc (DVD), and multimedia functionality independent of the infotainment center 46. Audio component 64 may contain a speaker system, or may utilize speaker 28 via arbitration on vehicle bus 32 and/or audio bus 22.

The vehicle crash and/or collision detection sensor interface 66 is operatively connected to the vehicle bus 32. The collision sensors 68 provide information to the telematics unit via the crash and/or collision detection sensor interface 66 regarding the severity of a vehicle collision, such as the angle of impact and the amount of force sustained.

Vehicle sensors 72, connected to various sensor interface modules 44 are operatively connected to the vehicle bus 32 and monitor various vehicle dynamics. Example vehicle sensors include but are not limited to gyroscopes, accelerometers, magnetometers, fuel tank monitors, emission detection, and/or control sensors, and the like. Sensor interface modules 44 include powertrain control, climate control, and body control, to name but a few. For example, a body control module (BCM) could provide for various vehicle functionality including, but not limited to, lock and unlock functionality, trunk or tailgate release, sound horn, turn on/off lights, remote start and engine start/stop functionality during typical communications with RKE or passive systems.

Wireless carrier system 14 may be a cellular telephone system or any other suitable wireless system that transmits signals between the vehicle hardware 20 and land network 16. According to an example, wireless carrier system 14 includes one or more cell towers 48

Land network 16 can be a conventional land-based telecommunications network that is connected to one or more landline telephones, and that connects wireless carrier system 14 to call center 18. For example, land network 16 can include a public switched telephone network (PSTN) and/or an Internet Protocol (IP) network, as is appreciated by those skilled in the art. Of course, one or more segments of the land network 16 can be implemented in the form of a standard wired network, a fiber or other optical network, a cable network, other wireless networks such as wireless local networks (WLANs) or networks providing broadband wireless access (BWA), or any combination thereof.

One of the networked devices that can communicate with the telematics unit 24 is a mobile computing device 57, such as a smart phone, wearable computing device such as a smart watch having two-way communication capabilities, personal laptop computer or tablet computer having two-way communication capabilities, a netbook computer, or any suitable combinations thereof. The mobile computing device 57 can include computer processing capability, a transceiver capable of communicating with wireless carrier system 14 and/or a GPS module capable of receiving GPS satellite signals and generating GPS coordinates based on those signals. In some implementations, the display 59 also includes a touch-screen graphical user interface.

Mobile device 57 may be used inside or outside of vehicle 12, and may be coupled to the vehicle wirelessly. The mobile device also may be configured to provide services according to a subscription agreement with a third-party facility or wireless/telephone service provider.

A short-range wireless connection (SRWC) module 74 allows mobile computing device 57 and telematics unit 24 to pair one with another (or link to one another) when within a wireless range (e.g., prior to experiencing a disconnection from the wireless network). SRWC pairing is known to skilled artisans (e.g., Bluetooth Low Energy). Call center 20 may participate in pairing mobile computing device 57 and telematics unit 30. For example, for added security, the call center 20 may initiate the inquiry procedure between the telematics unit 24 and mobile computing device 57.

The mobile computing device 57 may receive one or more software applications to be associated with vehicle 12. For example, the user of mobile device 57 may visit an online software application store or web-service and download a car-sharing software application (hereinafter "CarShare App") therefrom. The mobile computing device 57 may moreover install this CarShare App onto memory 61. Upon implementation, the CarShare App may moreover include one or more graphical user interfaces (GUIs) to include one or more prompts which instruct the user to provide information and/or provide one or more commands.

Call center 18 is designed to provide the vehicle hardware 20 with a number of different system backend functions and, according to the example shown here, generally includes one or more switches 52, servers 54 (remote entity), databases 56, advisors 58, as well as a variety of other telecommunication/computer equipment 60. These various call center components are suitably coupled to one another via a network connection or bus 62, such as the one previously described in connection with the vehicle hardware 20. Switch 52, which can be a private branch exchange (PBX) switch, routes incoming signals so that voice transmissions are usually sent to either advisor 58 or an automated response system, and data transmissions are passed on to a modem or other piece of telecommunication/computer equipment 60 for demodulation and further signal processing. The modem or other telecommunication/computer equipment 60 may include an encoder, as previously explained, and can be connected to various devices such as a server 54 and database 56. For example, database 56 could be designed to store subscriber profile records, subscriber behavioral patterns, or any other pertinent subscriber information. Although the illustrated example has been described as it would be used in conjunction with a call center 18 that is manned, it will be appreciated that the call center 18 can be any central or remote facility, manned or unmanned, mobile or fixed, to or from which it is desirable to exchange voice and data.

Figure 2:
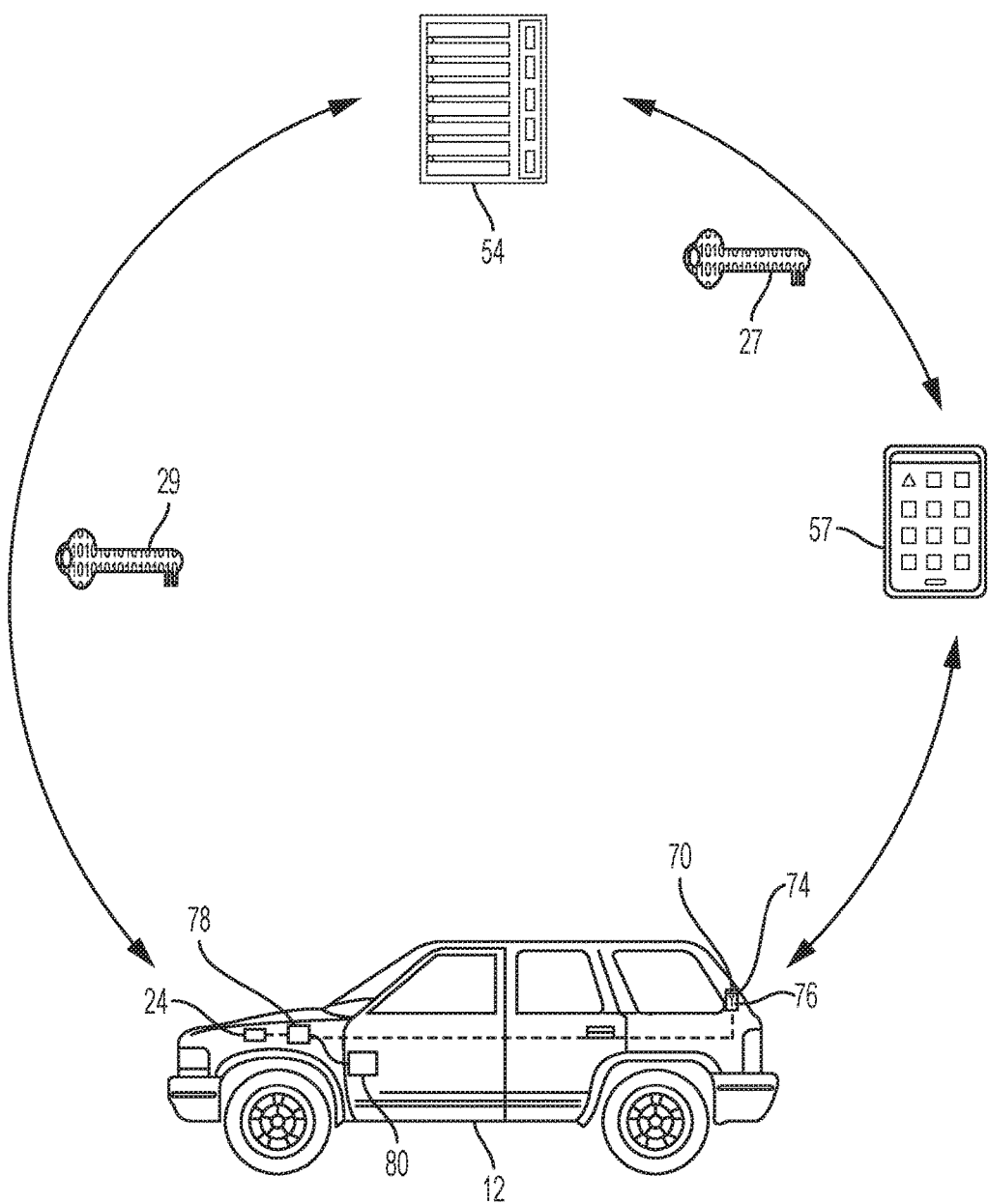
FIG. 2 illustrates a communication flow diagram between communicating entities for a vehicle-sharing system.

FIG. 2 illustrates communication flow diagram between communicating entities for a vehicle sharing system. The vehicle sharing system utilizes a SRWC module 74 to assist in authenticating mobile device 57 to a vehicle for enabling vehicle operations. The vehicle-sharing system allows a user to reserve a respective unreserved vehicle through their mobile computing device 57. The vehicle-sharing system pairs the user's mobile device 57 to the vehicle's SRWC module 74 so that functions of vehicle 12 (e.g., vehicle access and operation) may be performed by mobile computing device 57.

FIG. 2 illustrates vehicle 12, a mobile device 57, and a remote entity 54. The mobile device 57 is capable of communicating with the vehicle 12 and the remote entity 54 (call center server). The vehicle 12 is equipped with SRWC module 74 that includes, but is not limited to, a Bluetooth Low Energy (BLE) protocol, a Bluetooth protocol, a ZigBee protocol, an iBeacon protocol, an Eddystone protocol, a near field communication protocol, and/or a Wi-Fi protocol. The SRWC module 74 would include a SRWC chipset 76 and one or more antennas 70. The vehicle 12 further includes sensor interface module (BCM) 78, a vehicle communication platform (VCP) 24. BCM 78 includes various vehicle functionality including, but not limited to, lock and unlock functionality, trunk or tailgate release, sound horn, vehicle lights flashing configurations, remote start and engine start/stop functionality during typical communications with the Remote Keyless Entry (RKE) or passive systems.

The vehicle communication platform (VCP) 24 enables long distance data transmissions from the SRWC module 74 and OBD to the remote entity 54. The VCP 24, which may be embodied as the vehicle telematics unit (see FIG. 1), may provide a wireless hotspot accessible by the SRWC module 74 as a communication medium that can be used to provide the SRWC module with an additional authentication mechanism (i.e., the SRWC module may check for authentication agreement between what was provided by the mobile computing device 57 and what is provided by the remote entity). SRWC module 74 may alternatively include its own long range communication capabilities.

The SRWC module 76 can be embodied as an adaptive accessory device releasably coupled to an on-board diagnostic (OBD) port 80. OBD port 80 (also known as an ALDL port) is a component connected to the vehicle bus 32 and ultimately an on-board diagnostics system (e.g., OBD II). The OBD system may provide internal inspections and diagnoses of various vehicle systems (e.g., the vehicle power train, suspension, engine, etc.) so as to ensure the vehicle performance conforms to certain standards. To accomplish this effect, the OBD system 80 may be coupled directly to one or more vehicle sensors 72 and/or one or more sensor interface modules 44 (e.g., BCM). The OBD system may also communicate vehicle sensors 72 and/or sensor interface modules 44 via vehicle bus 32. The SRWC module 76 can also be embodied to be installed within vehicle 12 and be directly connected with the vehicle bus 32, so as to communicate with various vehicle systems one or more vehicle sensors 72 and/or one or more sensor interface modules 44. It should be appreciated that such an installation may be installed during vehicle manufacture or as part of an aftermarket installation.

The SRWC module concept enables fleet operators or vehicle-share operators to quickly and easily instrument large populations of existing vehicle with vehicle-sharing capabilities. The SRWC module 74 may include security mechanisms that protect the vehicle against unauthorized usage or theft by mechanisms that disable remote keyless functions unless authorization is received (i.e., the remote keyless electronics of the hardware are not powered unless a valid token has been received from a connecting phone and/or remote server entity). The SRWC module 76 replaces the need for storing an authorization key in a separate key fob to allow passive entry, passive lock, and passive engine start operations. Generating the passive commands can be performed utilizing a SRWC module 76, which will acquire the necessary keys as described herein for enabling and executing vehicle operations. To obtain the authorization keys, the remote entity 54 issues the public keys 27 and 29 to both the portable device 12 and optionally to the SRWC module 76.

Other schemes may be utilized, in addition to public key cryptography. When the user approaches the vehicle 12 with the mobile computing device 57, the mobile device may send a secure package to the SRWC module 74 which can be validated as originating from both the remote entity and the mobile device (i.e., the key and command request information are digitally signed). In this way of utilizing the public keys, the access token that originates from the mobile device 57 includes two layers of encapsulated information. An outer layer of the access token is the "command request" (e.g., lock, unlock, etc.) and is signed by the mobile device's public key. An inner layer of the access token is the "digital key" and includes a unmodified server-signed object, which provides a cleartext package of the allowed operations, constraints (allowed time frames, etc.), and the mobile device's 57 public certificate\key and other server information. The installed public key can be used so that the entire package (e.g., the digital key from the remote server and the command request from the phone) can be validated, such that each has originated from the true party. The SRWC module 76 and the mobile device 57 can authenticate one another for vehicle access and operation.

Coupling SRWC module 76 to the vehicle systems (i.e., via vehicle bus 32 or via OBD 80) allows for indirect communication between mobile device 57 and BCM 44 as well as various other vehicle modules. After authorized requests have been received by the SRWC module 76 and transmitted to remote entity 54, as discussed above, BCM 44 may operate to control the lock and unlock functions of the vehicle doors (including a trunk or tailgate release), engine ignition start, engine power off as well as other vehicle functions. Any person may therefore be provided access to the shared vehicle through the registration and authorization process utilizing their mobile device 57 (e.g., smart phone). It should be understood that the SRWC module 76 may be incorporated into numerous vehicle makes and models and may be removed or deactivated when the vehicle is no longer being utilized in the vehicle sharing system.

Figure 3:
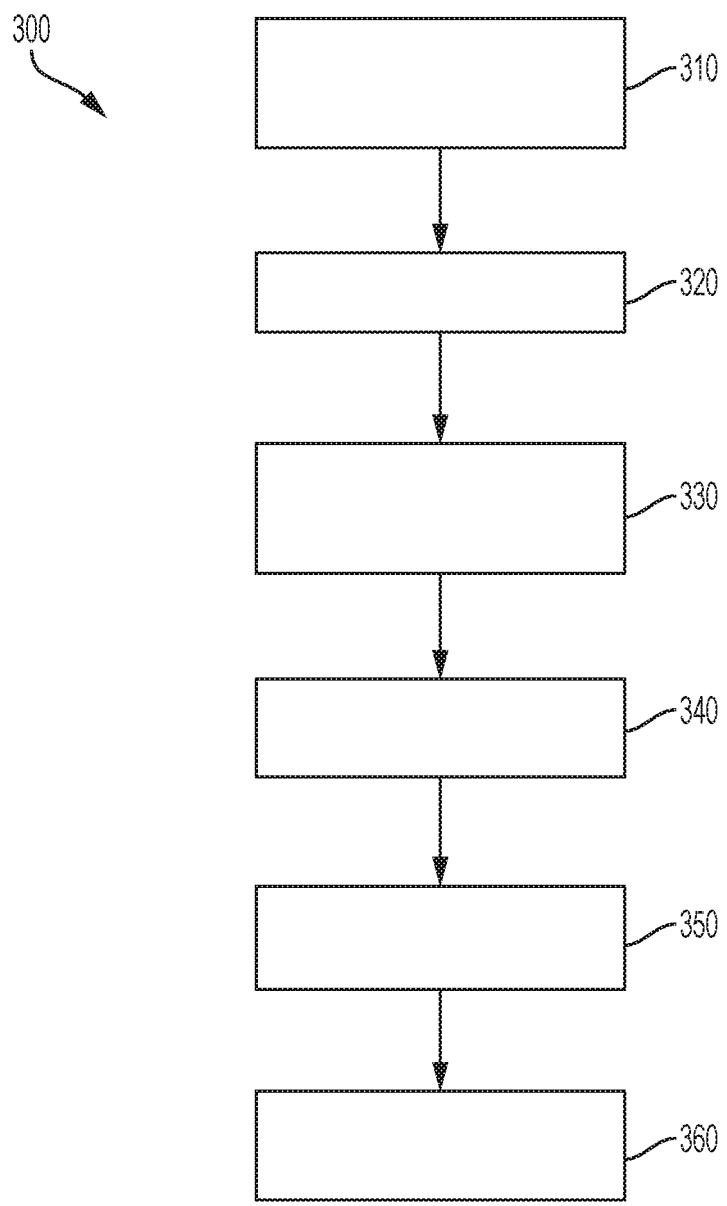
FIG. 3 is a broad overview flowchart for reserving and authorizing use of the vehicle.

FIG. 3 is a broad overview of method 300 for reserving and authorizing use of the vehicle equipped for vehicle sharing. In step 310, as an initial setup, the SRWC module is added to the vehicle either as installed or as a plug-in device connected to OBD 80. The SRWC module includes a keyless component that may be used to perform passive functions such as vehicle access and engine ignition. In step 320, utilizing the CarShare App on mobile device 57, a registration is generated by a user so as to reserve a vehicle which may be located at a specific parking location exhibited on the CarShare App (e.g., near the user's location). The vehicle may thus be parked at any location and may be located by a user through GPS/Navigation functions of the mobile computing device 57. The user then generates the vehicle registration by providing various details (i.e., directly or indirectly via the CarShare App), which include information directed to the mobile device identification (i.e., serial number), user name, and reservation details (e.g., start and finish times). The generated registration is then transmitted to the remote entity 54 and stored in a corresponding memory 56. As part of its back-end functions, remote entity 54 may review and analyze the generated registration details for various purposes (e.g., to transmit a registration start-time notification to the CarShare App on mobile computing device 57).

In step 330, authorization of the user is executed between the mobile computing device 57 and the SRWC module 76. In step 340, upon successful authorization, fob functions such as, but not limited to, lock, unlock, and passive start are enabled based on parameters established in the registration details as well as those physical limitations of mobile device 57 and SRWC module 74.

In step 350, passive start (i.e., engine ignition) is enabled based on a successful sensing and pairing of the mobile device 57 and SRWC module 74. Remote start may now be performed by the CarShare App, based on one or more commands when mobile computing device 57 is within the required proximity of vehicle 12. In step 360, upon completion of the registration, vehicle 12 is powered off and subsequently secured by wiping the authorization keys clean (i.e., erasing the key codes), and the vehicle cannot be reutilized by mobile device 57 without there being a reissuance of authorization keys.

Figure 4:
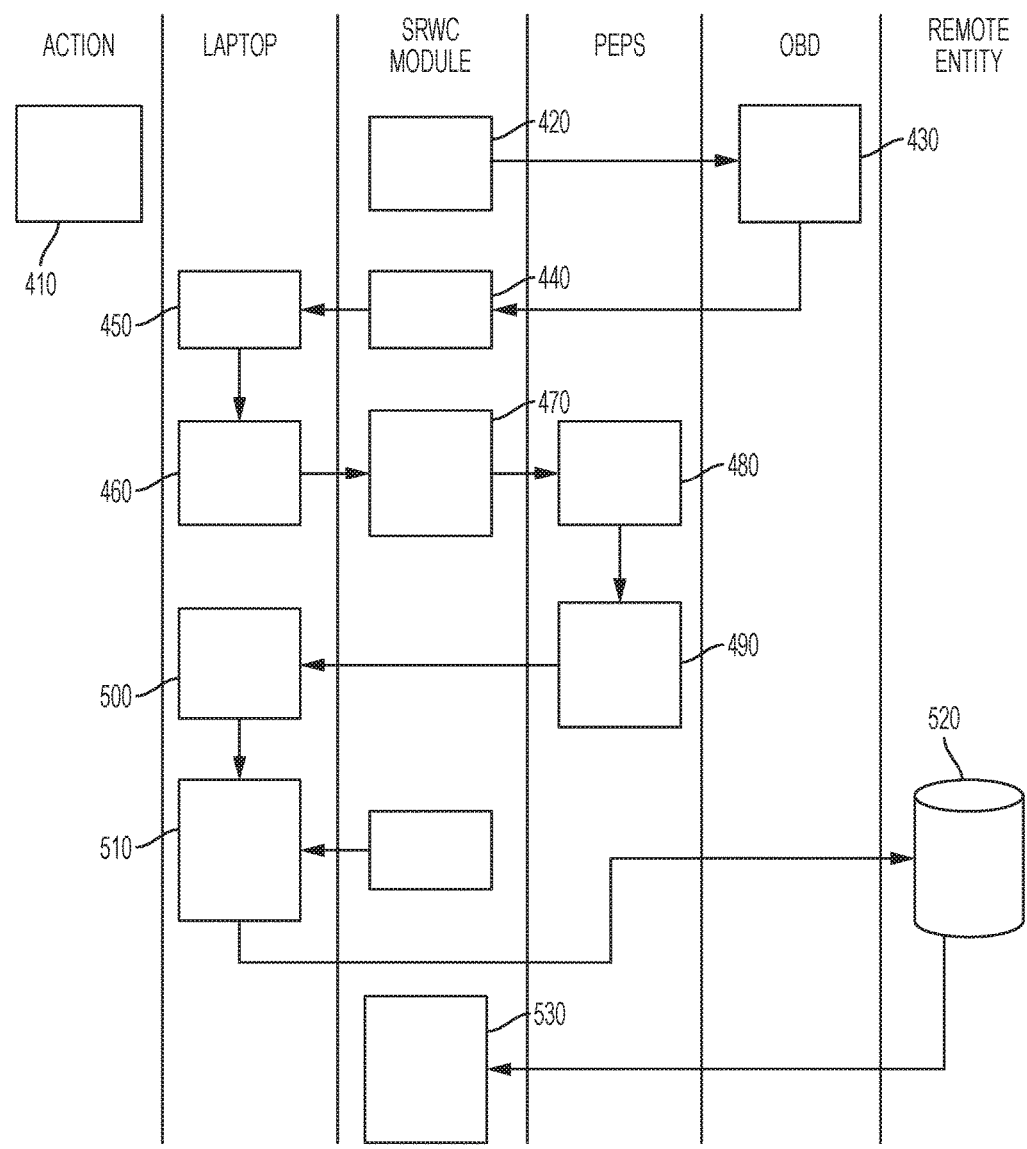
FIG. 4 is a flow diagram for initial setup of a SRWC module.

FIG. 4 represents a flow diagram for an initial setup 410 of the SRWC module 74 within vehicle 12 (as previously described in step 310 of FIG. 3). Upon installing SRWC module 74 in vehicle 12, all mobile devices are required to be paired and associated with the vehicle 12 as a remote keyless device. In step 420, the vehicle setup is initiated and SRWC module 74 is connected to the OBD 80, vehicle bus 32, Assembly Line Diagnostic Link (ALDL), or some other similar feature. In step 430, OBD 80 or vehicle bus 32 provides power to the SRWC module 74. In step 440, vehicle ignition is established (i.e., the engine is powered).

In step 450, if the SRWC module 74 utilizes communications provided by an in-vehicle wireless connection (e.g., a WiFi hotspot, Bluetooth pairing), a communication link is thuse coupled between vehicle 12 and SRWC module 74.

In step 460, a wireless communication identifier (i.e., the SSID) may be entered into SRWC module 74 so as to provide the device with Internet access. In step 470, SRWC module 74 is paired with the VCP and the connection with the wireless hotspot is confirmed as part of the installation procedure.

In step 480, at least one SRWC module antenna is connected to one of multiple Passive Entry/Passive Start (PEPS) locations in vehicle 12. In step 490, PEPS is coupled to the SRWC module 74. In this step, SRWC module 74 becomes considered as an additional vehicle passive entry/start fob.

In step 500, a valid PEPS connection is made with a remote computing device to further validate a successful pairing and functionality of the SRWC module 74 being considered a passive entry/start fob. In step 510, additional SRWC module information such as, but not limited to, the BLE node ID is collected from SRWC module 74 and is moreover provided to the computing device and may be used for fleet management purposes. In step 520, the remote entity 54 is contacted to provide authorization keys to perform cryptography validation through the pairing between the vehicle 12 and SRWC module 74. In step 530, end-to-end cryptography key delivery from the remote entity 54 to the SRWC module 74 is validated. As a result, the SRWC module 74 is successfully paired with vehicle 12 so as to access and communicate with the PEPS.

Figure 5:
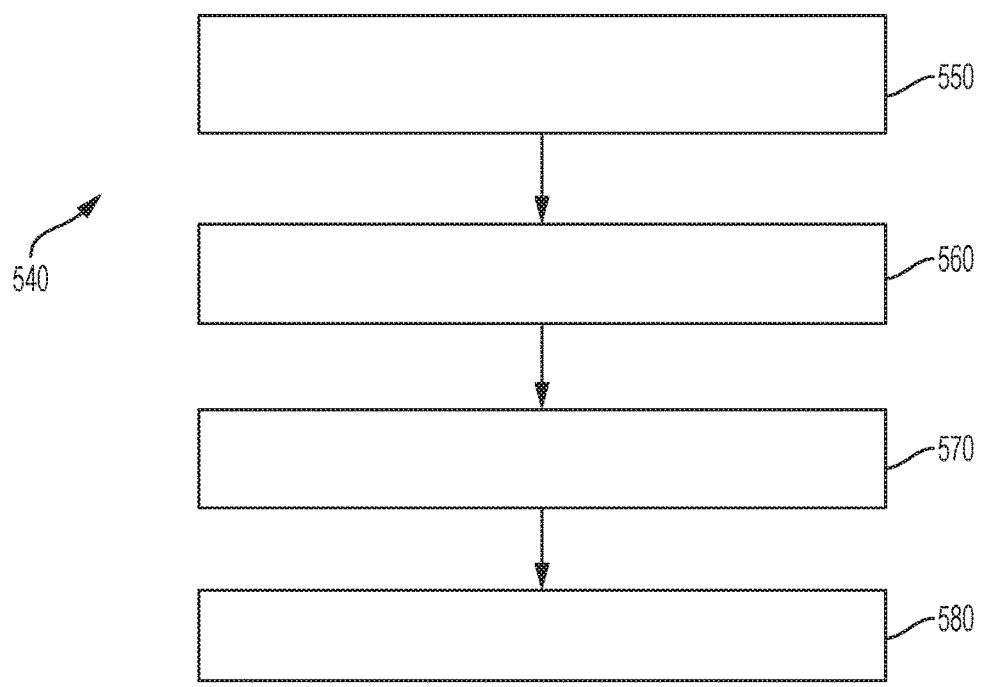
FIG. 5 is a flow chart for an exemplary methodology to reserve a vehicle.

FIG. 5 represents a flow diagram of method 540 for vehicle reservation through a mobile computing device 57 (as previously described in step 320 of FIG. 3). In step 550, while utilizing a CarShare App, the user registers a reservation. The registration includes, but is not limited to, a device ID (e.g., smart phone identifier), username, and reservation details (e.g., reservation start time, reservation end time, budgeted mileage, etc.), and operator license information.

In step 560, remote entity 54 (or a reservation service) generates a signed, encrypted access token for the registration. The access token is transmitted to mobile computing device 57 via the CarShare App within a predetermined period (e.g., 20 seconds) of time from the registration request. The signed access token may include a SRWC universal unique identifier (UUID), time range, and timestamp. In step 570, the CarShare App is activated on mobile device 57 and the user commands the start of the reservation via the CarShare App. In step 580, a confirmation and Access token is sent to the mobile computing device 57 and the confirmation is sent to the user via the CarShare App.

Figure 6:
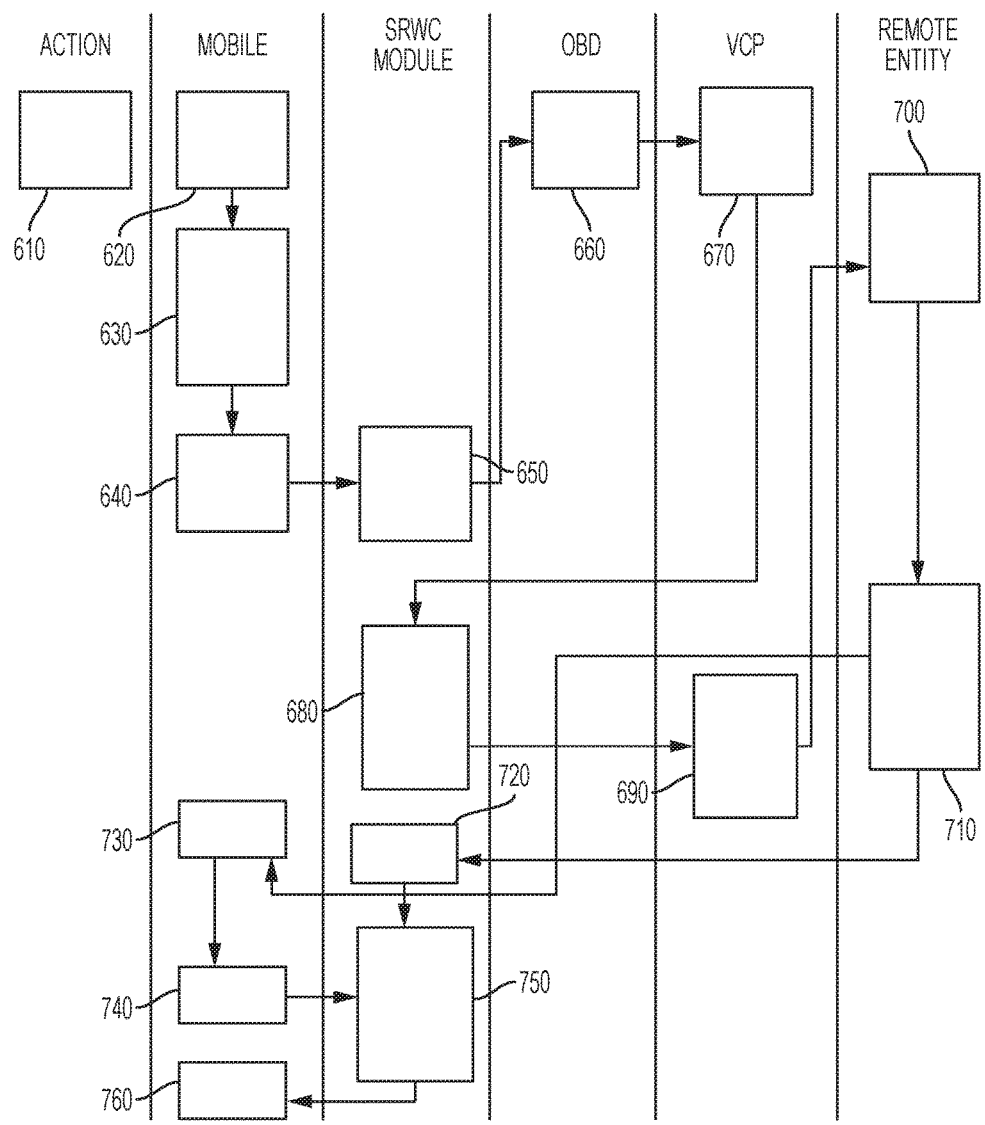
FIG. 6 is a flow diagram for the detection and authorization of a user based on an approaching mobile device.

FIG. 6 represents a detection and authorization 610 of the user based on the approaching mobile device. In step 620, in response to a user command or a driver approaching the vehicle with the registered mobile device, the CarShare App detects the vehicle SRWC node by implementing one or more wireless broadcasts. The SRWC module 74 periodically wakes up and broadcasts a challenge signal, including a corresponding UUID, for listening devices. For example, in an effort to save vehicle battery power, SRWC module may send the challenge signal every 30 seconds.

In step 630, the CarShare App recognizes the received UUID as a valid identification for the car. The CarShare App then pairs a mobile device 57 to the vehicle 12. In step 640, the CarShare App notifies the SRWC module 74 of the user being in close proximity to the vehicle 12.

In step 650, in response to the CarShare App notifying the SRWC module 74 as to the proximity of the user, the SRWC module 74 may transmit a BUS Wake-Up signal (call) to components on the BUS, if the wireless connection is also to be used as part of this authentication. In step 660, the OBD transmits a wake-up command (i.e., based on the BUS Wake-Up signal) to the VCP 24 hardware (telematics unit 30). In step 670, the VCP hardware wakes up and activates a SRWC node.

In step 680, SRWC module 74 can transmit one or more communications using the wireless communication mode (i.e., Wi-Fi). A request to ensure that the token has not been revoked is transmitted from the VCP 24 to the remote entity 54 via wireless carrier system 50. When this communication path is unavailable, alternatively, a check can be performed by the CarShare App via mobile computing device 57. In step 690, the request to validate the key or web token is transmitted by VCP 24 via wireless carrier system 50. In step 700, after the request for key validation is received by remote entity 54, and keys\token are tested to ensure that they are not to somehow become revoked.

In step 710, validation response is transmitted to the mobile computing device 57 and the CarShare App and\or to the SRWC module 74. In step 720, the authorization key validation is received by the VCP 24 and provided to SRWC module 74. In addition, in step 730, the authorization key validation is received by mobile computing device 57. In step 740, the authorization key is communicated to SRWC module 74 via mobile computing device 57.

In step 750, the SRWC module 74 validates the authorization key, using the digital signature and the public key of the remote entity 54. In step 760, a communication is sent to mobile computing device 57 to notify the user of the authentication of the paring between the CarShare App and SRWC module 74.

Figure 7:
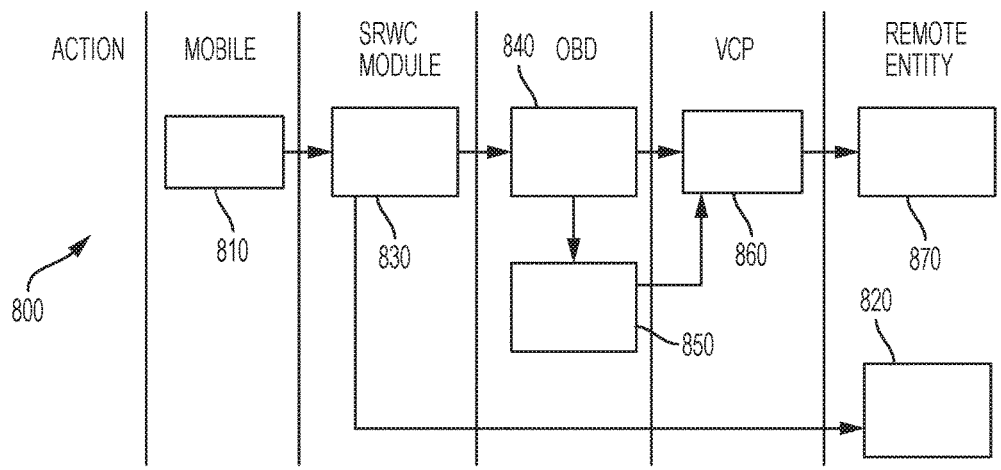
FIG. 7 is a flow diagram for executing vehicle functions via the mobile device.

FIG. 7 is a flow diagram for a method 800 for executing operational functions of the vehicle after authentication has been established between the SRWC module 74 and the mobile computing device 57.

In step 810, the CarShare App is authorized for driving vehicle 12, discussed above. Once the user is within the interior of vehicle 12, SRWC module 74 detects the mobile computing device 57 within the vehicle interior (i.e., via the SRWC interior antenna).

At step 820, SRWC module 74 will collaborate with the VCP 24 (via vehicle bus 32 or OBD 80) to transmit to remote entity 54 a mobile device-detection notice. In response to this detection notice, remote entity 54 may transmit one or more initiation notifications to VCP 24. VCP 24 may then implement display 39 (FIG. 1) to allow the user to view the initiation notification (e.g., via infotainment center console, instrument panel, IVVM, etc.). It should be appreciated display 39 may be implemented to exhibit the initiation notification at some point prior to the vehicle engine being powered on (step 814). It should also be understood that mobile computing device 57 may transmit the mobile device-detection notice directly to remote entity 54.

The initiation notification may include a "welcome message" to welcome the user to vehicle 12. The initiation notification may moreover include instructions to instruct the user on how to use vehicle 12, vehicle specifications, and vehicle-sharing system protocol (e.g., parking locations, insurance information, fuel information, vehicle mileage information, incurred fees information, etc.). It should be appreciated that the initiation notification may be standardized to provide a generic welcome message to the vehicle user or the notification may be customized to a specific user (i.e., via information provided during the registration process and/or while creating a CarShare App account on the mobile device) or certain vehicle model. The transmitted mobile device-detection notice may further include a timestamp to be used in the back-end functions, for example, the timestamp may be compared to the reservation details of the initial user registration. As such, the initiation notification transmitted to telematics unit 24 may include a reservation reminder which states the specific time when reservation is set to conclude as well as how much time remains before the conclusion of the reservation.

The SRWC module 74 may also communicate with various vehicle systems 72 via vehicle bus 32 (or indirectly via OBD 80) to retrieve various vehicle dynamics information. The mobile device-detection notice may thus further include dynamics information that is analyzed at the remote entity. Fuel tank information may, for example, be included in the mobile device-detection notice to state the status of the fuel tank at the moment of the mobile device-detection notice. This fuel tank information can then be stated in the initiation notification to ensure the user is aware how long they may operate vehicle 12 before requiring refueling.

In step 830, SRWC module 74 communicates with mobile device 57 to receive the authorization key and couples it with the unique authorization key it has stored in its memory database (e.g., cell chipset 34). As discussed above, these authorization keys enable initiation of the vehicle engine and the vehicle system functionalities associated therewith. The authorization keys are subsequently transmitted to remote entity (i.e., via OBD 80 and VCP 24).

In step 840, a customer initiates the vehicle engine ignition (e.g., by pushing an initiation button, voice command, etc.). It should be understood that PEPS functionality may be executed by authorizing vehicle engine access, as would be performed during a typical PEPS operation. In step 850, the engine is powered down and the user is allowed to drive the vehicle.

In step 860, while vehicle 12 is in operation, SRWC module 74 may communicate with mobile device 57 and BCM 44 (or other vehicle systems), to compile information received from each and generate one or more trip-information notices. SRWC module 74, for example, receive battery life information from mobile device 57. Through BCM 44 and the other vehicle systems 72, SRWC module 74 may receive vehicle dynamics information such as, for example, fuel level and trip distance information (e.g., odometer information). After the proper information has been compiled, SRWC module 74 may transmit the trip-information notices to VCP 24. In certain instance, VCP 24 may access GNSS chipset/component 42 to further incorporate navigational coordinates (e.g., GPS coordinates) into the compiled information. SRWC module 74 may receive and compile the information continuously to generate an ongoing and continuous trip-information notice (i.e., streaming data) or SRWC module 74 may receive and compile the information during select time intervals to generate multiple trip-information notices (i.e., pushing data packets). It should be appreciated that one or more aspects of step 860 may be completed through OBD 80 instead of SRWC module 74.

In step 870, the trip-information notice is transmitted to remote entity 54, via the VCP 24. Upon receiving the compiled information, remote entity 24 may employ one or more of the back-end functions to review and analyze the trip-information notice. Once a proper review and analysis has been conducted, remote entity 54 may transmit one or more expedition notifications to telematics unit 24 (VCP) to assist the vehicle driver. Telematics unit 24 may also implement display 39 to allow the user to view each expedition notification (e.g., via infotainment center console, instrument panel, IVVM, etc.). Remote entity 54 may be configured to transmit the information continuously (i.e., streaming data) or during select time intervals (i.e., pushing data).

One or more of the expedition notifications may, for example, provide a warning to the vehicle user as to when the fuel tank reaches a certain status, such as, but not limited to, those instances when the tank becomes ¼ full (one-fourth). The expedition notifications may further provide information to assist the user in the refueling process. For example, when the fuel tank reaches a certain status, the expedition notification may provide steps that assist the user in the refueling process (e.g., how to use the vehicle's gas card, gas cap location, etc.). The expedition notifications even further provide directions to the closest refueling stations (i.e., via incorporation of the navigational coordinates). In another example, the expedition notifications may provide a warning to the vehicle user as to when the vehicle has exceeded the budgeted mileage for the trip.

Figure 8:
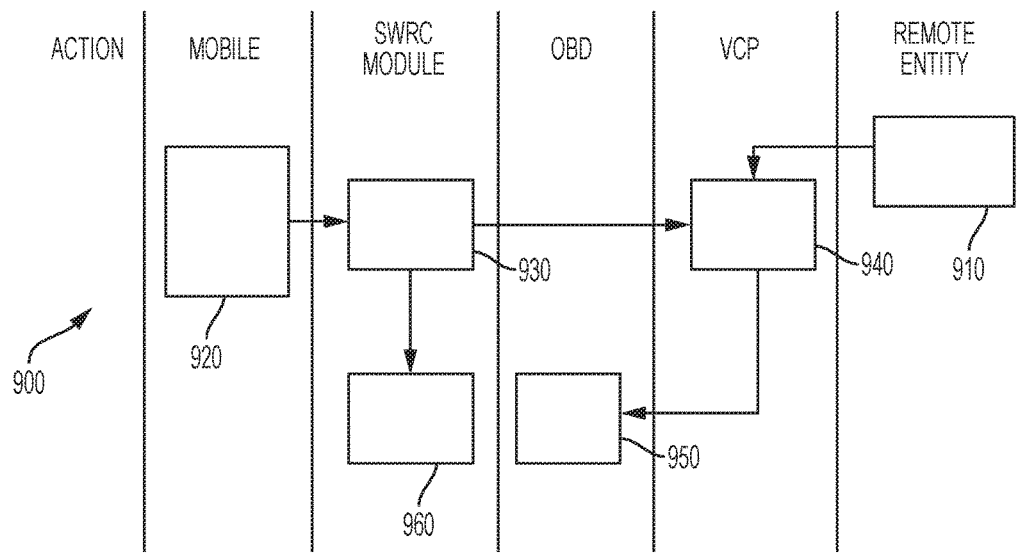
FIG. 8 is a flow diagram for executing additional vehicle functions of the vehicle.

FIG. 8 represents a flowchart of a method 900 for concluding vehicle usage and subsequently securing the vehicle.

In step 910, as part of the back-end functions of remote entity 24, based on the registration information, remote entity 24 will recognize when a certain amount of time remains in the registration (e.g., 15 minutes) and then transmit one or more completion notifications to VCP 24. The completion notifications may further provide information to assist the driver in completing their trip. The expedition notifications may, for example, provide directions (e.g., turn-by-turn navigations) to the original vehicle vehicle-share system parking location or the closest system authorized parking location (i.e., via incorporation of the navigational coordinates provided in one or more trip-information notices). VCP 24 may also implement display 39 to allow the user to view each completion notification (e.g., via infotainment center console, instrument panel, IVVM, etc.).

In step 920, upon completion of the vehicle registration and in response to the user completing their reservation, the user may accesses the CarShare App. The user then enters one or more trip-completion commands into the CarShare App to establish the registration is terminated. The CarShare App may otherwise terminate the registration by automatically time out the registration at the designated reservation end time. Mobile Device 57 will then communicate this termination notice to SRWC module 74 to subsequently be sent to remote entity 54 as a termination notice. SRWC module 74 may otherwise communicate the termination notice when it is recognized that the short-range wireless communications have been severed and/or mobile device 57 has become undetectable by SRWC module 74 for a certain amount of time. It should be appreciated that mobile device 57 may also send the termination notice directly to remote entity 54.

Upon receiving the termination notice, remote entity 24 may transmit one or more reservation-termination notifications to VCP 24, which may assist the driver in exiting the vehicle. The reservation-termination notifications may, for example, display a reminder for the user to remove their personal belongings from the vehicle (e.g., "do not forget your phone", "please remove all garbage", etc.). The reservation-termination notifications may further request the user to interactively provide feedback via display 39. The feedback may then be transmitted back to remote entity 54 via aspects of the methodologies discussed above.

If the trip-completion command is entered into the CarShare App or an automatic time out is established, when the vehicle is a location other than an authorized system parking location (i.e., via the navigational coordinates), remote entity 24 may transmit one or more completion notifications to VCP 24. The completion notifications may, for example, provide a warning for the user to understand that additional charges may be incurred for a violation of the registration agreement terms. In certain instances, the completion notifications may further warn the user if the vehicle does not begin on a path to return to the original vehicle share system parking location or the closest authorized parking location (i.e., via incorporation of the navigational coordinates), the vehicle engine will be remotely deactivated. Such a remote deactivation may be completed by known methodologies and which may be conducted through remote entity 54 and/or other features of call center 18.

In step 930, upon exiting the vehicle, a door-lock-command notice may be transmitted by the SRWC module 74 to request a door lock command. In this step, SRWC module 74 may be implemented to detect whether mobile device 57 remains within the vehicle. If it is determined that mobile device 57 remains within the vehicle, BCM 44 and/or VCP 24 may be implemented to generate a reminder notice to remote entity. In return, remote entity 54 may generate and transmit back to VCP 24 a reminder notification so as to let the driver know mobile device 57 is still in the vehicle. The reminder notification may, for example, cause the vehicle horn to honk and/or lights to flash. VCP 24 may also implement display 39 to generate the reminder notification (e.g., via infotainment center console, instrument panel, IVVM, etc.).

In step 940, the door-lock-command notice is transmitted via the VCP 24, through the methodologies discussed above. In step 950, the vehicle doors are locked via the vehicle systems, such as BCM 44 (discussed above). In step 960, in response to the transmitted door-lock-command notice, the current authorization keys, sent by mobile device 57 and generated by SRWC module 74, are wiped clean from the SRWC module memory (i.e., erased) and may be further designated as exhausted. In step 970, a trip end message may be displayed on CarShare App of the mobile computing device.

It should be understood that any of the above discussed initiation notifications, completion notifications, reservation-termination notifications, expedition notifications, reminder notification, or any other notification may include advertisement information. It should be appreciated that implementation of display 39 to provide any of the above discussed notifications may reduce driver distraction and serve as a safer alternative/supplemental medium for providing such notifications.

Figure 9:
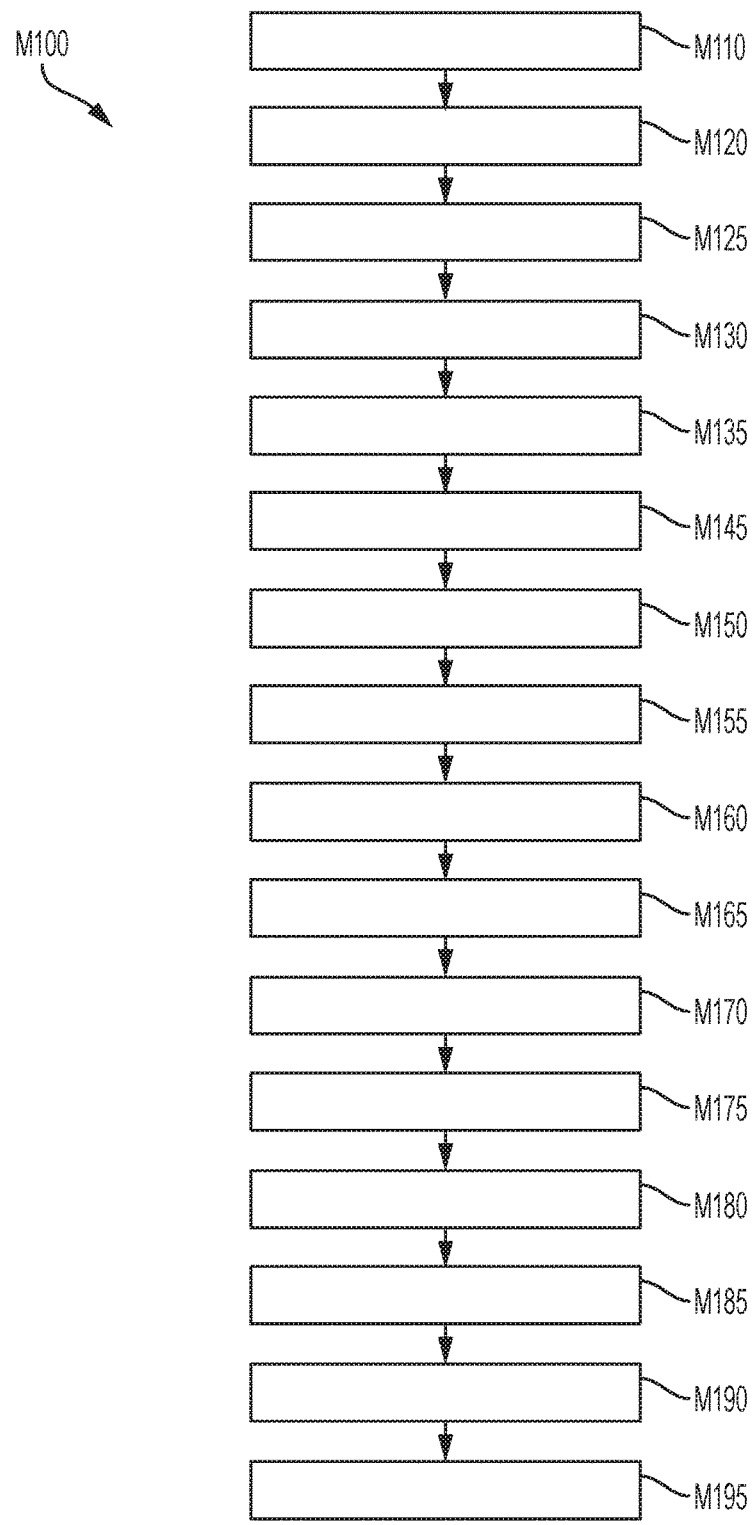
FIG. 9 is an exemplary algorithmic flowchart for relationship management in an exemplary vehicle-share system.

Turning now to FIG. 9, there is shown an example of method M100 of relationship management in a vehicle vehicle-share system. One or more steps of method M100 may be completed through the implementation of remote entity 54 which may include one or more executable instructions (software algorithms) incorporated into memory databases 56 and executed by remote entity 54. One or more aspects of method M100 may moreover be implemented by SRWC module 74, OBD 80, and/or VCP 24 of vehicle 12, which may include one or more executable instructions (software algorithms) incorporated into a database in vehicle 12 and executed by SRWC module 74, OBD 80, and/or VCP 24 of vehicle 12.

Step M110 includes providing a short-range wireless communication (SRWC) module being located in a vehicle, The SRWC module may be configured to communicate with a mobile computing device and at least one vehicle system. Step M120 includes providing a vehicle communication platform (VCP) being located within the vehicle. The VCP may be communicably coupled to the SRWC module 74 and may generate one or data transmissions. Step M125 includes providing a remote entity 54 that can receive the one or more VCP data transmissions. Step M130 includes providing the mobile computing device with the CarShare App installed onto the mobile device 57.

Step M135 includes one or more communications from the mobile computing device being received at the SRWC module. Step M145 a notice being generated by the SRWC module and/or through the CarShare App on the mobile computing device. These notice may be based on the one or more communications. Step M150 includes the notice being received at VCP 24. Step M155 includes VCP 24 transmitting the notice to the remote entity. Step M160 includes the notice being received by the remote entity. Optional step M165 includes an implementation of the remote entity's back-end functions to review and analyze the notice data. Step M170 includes a notification being sent to the VCP by the remote entity. Step M180 includes the notification from the remote entity being received by the VCP. In optional step M185, the mobile computing device may send a notice to the remote entity directly. In optional step M190, the SRWC module may receive vehicle dynamics information from one or more vehicle sensors. In optional step M195, the SRWC module may compile the vehicle dynamics information.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A vehicle-share relationship management system comprising:
   a short-range wireless communication (SRWC) module located in a vehicle and configured to communicate with a mobile computing device and at least one vehicle system, the SRWC module comprising a SRWC module memory;
   a vehicle communication platform (VCP) located within the vehicle, the VCP configured to communicably couple with the SRWC module and configured to generate one or more data transmissions;
   a remote entity configured to receive the one or more VCP data transmissions;
   wherein the SRWC module collaborates with the vehicle system and mobile computing device to generate one or more notices, the SRWC module subsequently collaborates with the VCP to transmit the one or more notices to the remote entity, wherein the one or more notices is selected from a group comprising: a door-lock-command notice, a reminder notice, a termination notice, a trip-information notice, mobile device-detection notice, or a combination thereof;
   wherein, when the door-lock-command notice is generated, the SRWC module detects whether the mobile computing device remains located within the vehicle;
   wherein, in response to the door-lock-command notice being transmitted, the SRWC module wipes an authorization key clean from the SRWC module memory and the SRWC module designates the authorization key as exhausted;
   wherein, in response to the one or more notices, the remote entity communicates one or more notifications to the VCP, wherein the one or more notifications is selected from a group comprising: an initiation notification, a completion notification, a reservation-termination notification, an expedition notification, a reminder notification, or a combination thereof; and
   wherein, when the reservation-termination notification is communicated, the VCP displays a reminder to remove personal belongings from the vehicle on a display of the VCP, and wherein the reservation-termination notification further requests for interactive feedback through the display of the VCP.

2. The relationship management system of claim 1, the system further comprising:
   the mobile computing device comprising a CarShare App; and
   wherein the one or more notices may be generated via the mobile computing device and/or the CarShare App.

3. The relationship management system of claim 1, wherein the SRWC module communicates with the at least one vehicle system and VCP via a vehicle bus.

4. The relationship management system of claim 1, wherein the remote entity is a server located in a remote call center.

5. The relationship management system of claim 1, wherein the SRWC module implements a wireless protocol selected from a group comprising: a Bluetooth low power protocol, a Bluetooth protocol, a ZigBee protocol, an iBeacon protocol, an Eddystone protocol, a near field communication protocol, a Wi-Fi protocol, or a combination thereof.

6. A method of relationship management in a vehicle-share system, the method comprising:
   (a) providing a short-range wireless communication (SRWC) module located in a vehicle and configured to communicate with a mobile computing device and at least one vehicle system, the SRWC module comprising a SRWC module memory;
   (b) providing a vehicle communication platform (VCP) located within the vehicle, the VCP configured to communicably couple with the SRWC module and configured to generate one or more data transmissions;
   (c) providing a remote entity configured to receive the one or more VCP data transmissions;
   (d) receiving, at the SRWC module, one or more communications from the mobile computing device;
   (e) generating, via the SRWC module, one or more notices based on the one or more communications, wherein the one or more notices is selected from a group comprising: a door-lock-command notice, a reminder notice, a termination notice, a trip-information notice, mobile device-detection notice, or a combination thereof;

(f) when the door-lock-command notice is generated, via the SRWC module, detecting whether the mobile computing device remains located within the vehicle;

(g) receiving, at the VCP, the one or more notices;

(h) transmitting, via the VCP, the one or more notices to the remote entity;

(i) in response to the door-lock-command notice being transmitted, via the SRWC module, wiping an authorization key clean from the SRWC module memory and further designating the authorization key as exhausted;

(j) receiving, at the remote entity, the one or more notices;

(k) sending, via the remote entity, one or more notifications, wherein the one or more notifications is selected from a group comprising: an initiation notification, a completion notification, a reservation-termination notification, an expedition notification, a reminder notification, or a combination thereof; and (l) receiving, at the VCP, the one or more notifications from the remote entity, wherein, when the reservation-termination notification is communicated, the VCP displays a reminder to remove personal belongings from the vehicle, and wherein the reservation-termination notification further requests for interactive feedback, via the display of the VCP.

7. The method of relationship management of claim 6, the method further comprising:

(k) implementing one or more back-end functions, via the remote entity, to review and analyze the one or more notices.

8. The method of relationship management of claim 6, the method further comprising:

(k) receiving, at the SRWC module, one or more portions of vehicle dynamics information from one or more vehicle sensors; and (l) compiling, via SRWC module, the vehicle dynamics information.

9. The method of relationship management of claim 6, the method further comprising:

(k) providing the mobile computing device comprising a CarShare App;

(l) generating, via the mobile computing device and/or the CarShare App, one or more notices; and (m) sending, via the mobile computing device, the one or more notices to the remote entity.

10. The method of relationship management of claim 6, wherein the remote entity is a server located in a remote call center.

11. The method of relationship management of claim 6, wherein the SRWC module implements a wireless protocol selected from a group comprising: a Bluetooth low power protocol, a Bluetooth protocol, a ZigBee protocol, an iBeacon protocol, an Eddystone protocol, a near field communication protocol, a Wi-Fi protocol, or a combination thereof.

12. A method of relationship management in a vehicle-share system, the method comprising:

(a) providing a short-range wireless communication (SRWC) module located in a vehicle and configured to communicate with a mobile computing device and at least one vehicle system, the SRWC module comprising a SRWC module memory;

(b) providing a vehicle communication platform (VCP) located within the vehicle, the VCP configured to communicably couple with the SRWC module and configured to generate one or data transmissions;

(c) providing a remote entity configured to receive the one or more VCP data transmissions;

(d) providing the mobile computing device comprising a CarShare App;

(e) receiving, at the SRWC module, one or more communications from the mobile computing device;

(f) generating, via the SRWC module and/or the mobile computing device and/or the CarShare App, one or more notices based on the one or more communications, wherein the one or more notices is selected from a group comprising: a door-lock-command notice, a reminder notice, a termination notice, a trip-information notice, mobile device-detection notice, or a combination thereof;

(g) when the door-lock-command notice is generated, via the SRWC module, detecting whether the mobile computing device remains located within the vehicle;

(h) receiving, at the VCP, the one or more notices;

(i) transmitting, via the VCP, the one or more notices to the remote entity;

(j) in response to the door-lock-command notice being transmitted, via the SRWC module, wiping an authorization key clean from the SRWC module memory and further designating the authorization key as exhausted;

(k) receiving, at the remote entity, the one or more notices;

(l) implementing one or more back-end functions, via the remote entity, to review and analyze the one or more notices;

(m) sending, via the remote entity, one or more notifications to the VCP, wherein the one or more notifications is selected from a group comprising: an initiation notification, a completion notification, a reservation-termination notification, an expedition notification, a reminder notification, or a combination thereof; and (n) receiving, at the VCP, the one or more notifications from the remote entity, wherein, when the reservation-termination notification is communicated, the VCP displays a reminder to remove personal belongings from the vehicle, and wherein the reservation-termination notification further requests for interactive feedback, via the display of the VCP.

13. The method of relationship management of claim 12, the method further comprising:

(m) sending, via the mobile computing device, the one or more notices to the remote entity.

14. The method of relationship management of claim 12, the method further comprising:

(m) receiving, at the SRWC module, one or more portions of vehicle dynamics information from one or more vehicle sensors; and (n) compiling, via the SRWC module, the vehicle dynamics information.

* * * * *